(12) United States Patent
Belarbi et al.

(10) Patent No.: US 11,904,638 B2
(45) Date of Patent: Feb. 20, 2024

(54) TREAD FOR A TIRE

(71) Applicant: COMPAGNIE GENERALE DES ETABLISSEMENTS MICHELIN, Clermont-Ferrand (FR)

(72) Inventors: Houria Belarbi, Clermont-Ferrand (FR); Walid Djabour, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 272 days.

(21) Appl. No.: 17/312,660

(22) PCT Filed: Dec. 5, 2019

(86) PCT No.: PCT/FR2019/052939
§ 371 (c)(1),
(2) Date: Jun. 10, 2021

(87) PCT Pub. No.: WO2020/120881
PCT Pub. Date: Jun. 18, 2020

(65) Prior Publication Data
US 2022/0048338 A1    Feb. 17, 2022

(30) Foreign Application Priority Data

Dec. 14, 2018  (FR) ........................................ 1872956
Jan. 30, 2019  (FR) ........................................ 1900818

(51) Int. Cl.
*B60C 11/13*   (2006.01)

(52) U.S. Cl.
CPC ... *B60C 11/1353* (2013.01); *B60C 2011/1361* (2013.01)

(58) Field of Classification Search
CPC ..... B60C 2011/1361; B60C 2011/1338; B60C 11/1353; B60C 11/0323; B60C 11/1315
See application file for complete search history.

(56) References Cited

U.S. PATENT DOCUMENTS 3,727,661 A     4/1973  Hoke
4,703,788 A  * 11/1987  Kusube ................. B60C 11/045
                                              152/DIG. 3

(Continued)

FOREIGN PATENT DOCUMENTS

EP         0908330         4/1999
JP     2001030718 A  *  2/2001  ......... B60C 11/0309

(Continued)

OTHER PUBLICATIONS

JP 2010-052699 Machine Translation (Year: 2010).*
JP2001-030718 Machine Translation (Year: 2001).*

*Primary Examiner* — Justin R Fischer
*Assistant Examiner* — Wendy L Boss
(74) *Attorney, Agent, or Firm* — Cozen O'Connor

(57) ABSTRACT

A tread (12) for a tire (10) which has a tread surface intended to contact a road surface during running. The tread (12) has at least one cavity opening onto the tread surface when new, called external cavity (14), which has length L, width W and central plane P. The external cavity (14) has bottom (16) and at least two opposite lateral walls (18a, 18b) extending from bottom (16) and a mechanism (20) for ejecting stones during running, which has two protuberances (22a, 22b) from bottom (16) of external cavity, which are disposed at least partially opposite one another at a distance d. Each protuberance (22a, 22b) is inclined respectively from a lateral wall (18a, 18b) of the external cavity (14) towards the central plane P. The distance d between the two protuberances (22a, 22b) is less than or equal to 10% of width W of external cavity (14).

10 Claims, 4 Drawing Sheets

(56) References Cited

U.S. PATENT DOCUMENTS

| | | | | |
|---|---|---|---|---|
| 2012/0132333 A1* | 5/2012 | Ebiko | ............... | B60C 11/1315 |
| | | | | 152/209.8 |
| 2013/0061993 A1* | 3/2013 | Mathonet | ............. | B60C 11/042 |
| | | | | 152/209.22 |
| 2016/0318348 A1* | 11/2016 | Cambon | ............. | B60C 11/1307 |
| 2018/0170116 A1* | 6/2018 | Daries | ................. | B60C 11/13 |

FOREIGN PATENT DOCUMENTS

| | | |
|---|---|---|
| JP | 2010052699 | 3/2010 |
| JP | 2013244854 | 12/2013 |
| WO | WO 2011/039194 | 4/2011 |
| WO | WO 2011073313 | 6/2011 |
| WO | WO 2017174925 | 10/2017 |

\* cited by examiner

A-A

US 11,904,638 B2

TREAD FOR A TIRE

RELATED APPLICATIONS

This is a U.S. National Phase Application under 35 USC 371 of International Application PCT/FR2019/052939 filed on Dec. 5, 2019.

This application claims the priority of French application nos. FR 18/72956 filed Dec. 14, 2018 and FR 19/00818 filed Jan. 30, 2019, the entire content of all of which are hereby incorporated by reference.

FIELD OF THE INVENTION

The present invention relates to a motor vehicle tire with a tread provided with external cavities comprising means for ejecting stones.

BACKGROUND OF THE INVENTION

Document WO 2011/039194 discloses a tread having at least one continuous groove comprising a plurality of external cavities that open onto the tread surface in the new state and a plurality of internal cavities that are positioned radially and entirely inside the tread in the new state. Each external cavity of a continuous groove is connected to at least two internal cavities of the same groove by connecting channels ensuring continuity between said internal and external cavities. It is thus possible to obtain a tread provided with grooves that make it possible to achieve performance that is the same as or better than the minimum safety performance in terms of drainage, irrespective of the level of wear of this tread, while at the same time substantially improving the wear life performance, reducing rolling resistance and improving the endurance of the tread with respect to attack. However, under certain running conditions, foreign objects such as stones can become trapped in the cavities and attack the bottom of said cavities. There is then a risk of the generation of cracks in the rubber being initiated.

In order to limit the trapping of stones in the tread, document U.S. Pat. No. 3,727,661 discloses the use of means for ejecting stones. These means comprise a plurality of generally parallelepipedal bars protruding from the bottom of a groove. The bars are connected to the walls of the groove and follow one another along the length of said groove. In one embodiment illustrated in FIG. 5, each bar has, viewed in section, a crescent-shaped section with a base of generally constant thickness in the bottom of the groove and two legs rising from said base towards the surface of the tread, respectively along the walls of the groove. The width of the legs decreases in the direction of the surface of the tread. However, during running, the tread is subjected to mechanical stresses that generate crack initiators in the base of the bars, causing premature deterioration of the means for ejecting stones. There is therefore a need to obtain a tread provided with grooves that makes it possible to achieve performance that is the same as or better than the minimum safety performance in terms of drainage, irrespective of the level of wear of this tread while at the same time having in said tread lasting means for ejecting stones.

SUMMARY OF THE INVENTION

The present invention aims to remedy this drawback.

More particularly, the present invention aims to improve the drainage capacities of a tread while at the same time having means for ejecting stones that are lasting over time.

The invention relates to a tread for a tire, comprising a tread surface intended to come into contact with a road surface during running. The tread comprises at least one cavity that opens onto the tread surface in the new state, called external cavity. The external cavity comprises a bottom and at least two opposite lateral walls extending from this bottom. Furthermore, the external cavity comprises means for ejecting stones during running.

According to a general feature of the invention, the means for ejecting stones comprise two protuberances protruding from the bottom of the external cavity, the two protuberances being disposed at least partially opposite one another at a distance d. Each protuberance is inclined from a lateral wall of the external cavity towards the central plane P. The distance d between two opposite protuberances is less than or equal to 10% of the width W of the external cavity.

The distance d between the two protuberances makes it possible to decouple said protuberances. Thus, during running, the two protuberances can move completely independently. The generation of cracks in the means for ejecting stones is then limited.

A "tire" means all types of resilient tread, whether or not it is subjected to an internal pressure.

A "rubbery material" means a diene elastomer, that is to say, in a known way, an elastomer which is based, at least partially (i.e. is a homopolymer or a copolymer), on diene monomers (monomers bearing conjugated or non-conjugated carbon-carbon double bonds).

The "tread" of a tire means a quantity of rubbery material delimited by lateral surfaces and two main surfaces, one of which, referred to as the tread surface, is intended to come into contact with a road surface when the tire is being driven on. The tread comprises a plurality of cuts (sipes, grooves) extending in the direction of the lateral surfaces.

Advantageously, the distance d between the two protuberances is less than or equal to 5% of the width W of the external cavity.

Advantageously, the distance d is less than or equal to 1 mm.

In one embodiment, at least one protuberance has a contact surface designed to come into contact with a stone. The contact surface has a region of attachment to the lateral wall of the external cavity, of length l', and a delimiting region in the external cavity, on the opposite side from the attachment region and of length l". The length l' of the attachment region is greater than the length l" of the delimiting region.

By optimizing the shape of the protuberance, the volume occupied by this protuberance in the external cavity is reduced. The evacuation of water from said external cavity in the event of a wet road surface is then promoted.

In one embodiment, the inclination of the protuberance is greater than or equal to 17°. Thus, the volume occupied by the protuberance in the external cavity is further optimized.

Advantageously, the lateral wall of the external cavity is at least partially inclined with respect to the tread surface of the tread, and the inclination of the protuberance is greater than the inclination of said lateral wall.

Advantageously, the lateral wall of the external cavity has an inclined part extending as far as the tread surface and a straight part, the protuberance extending from the straight part of said lateral wall.

In one embodiment, the protuberances are offset with respect to one another in a circumferential direction.

In one embodiment, the tread comprises a plurality of cavities that do not open onto the tread surface of the tread in the new state, called internal cavities, said internal cavities forming a groove with the external cavities.

In one embodiment, the tread belongs to a heavy-duty tire.

BRIEF DESCRIPTION OF THE DRAWINGS

The present invention will be understood better upon reading the detailed description of embodiments that are given by way of entirely non-limiting examples and are illustrated by the appended drawings, in which.

DETAILED DESCRIPTION OF THE DRAWINGS

Figure 1:
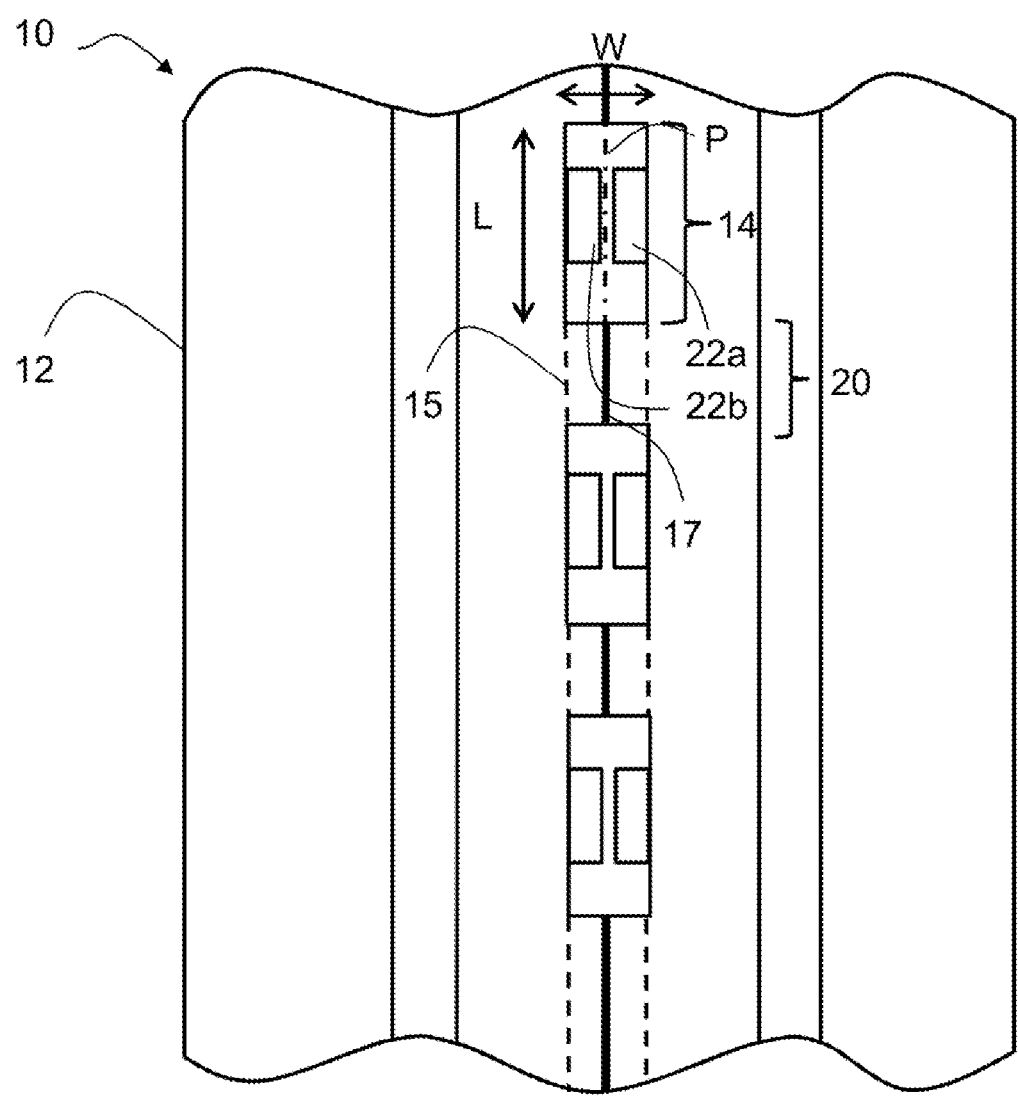
FIG. 1 is a top view of a tread part comprising means for ejecting stones according to a first embodiment of the invention.

FIG. 1 schematically shows a part of a tread 12 of a tire 10. The tread 12 comprises a tread surface intended to come into contact with a road surface when the tire is being driven on. The tread comprises a plurality of cuts (sipes, grooves). The tire 10 is intended to be fitted on a rim of a motor vehicle, for example a vehicle of heavy-duty type.

Figure 2:
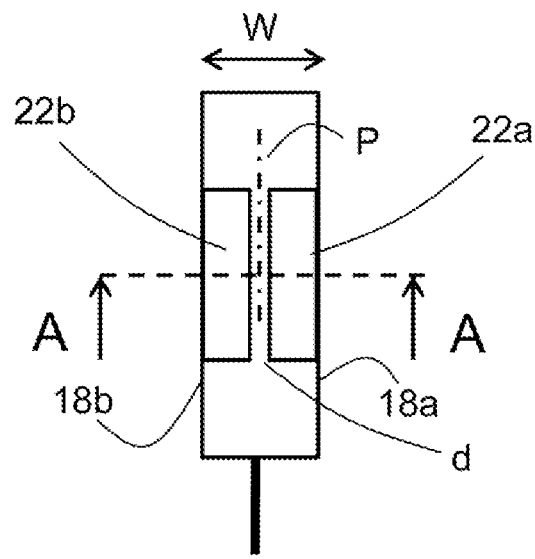
FIG. 2 is an enlarged view of the means for ejecting stones in FIG. 1.
Figure 3:
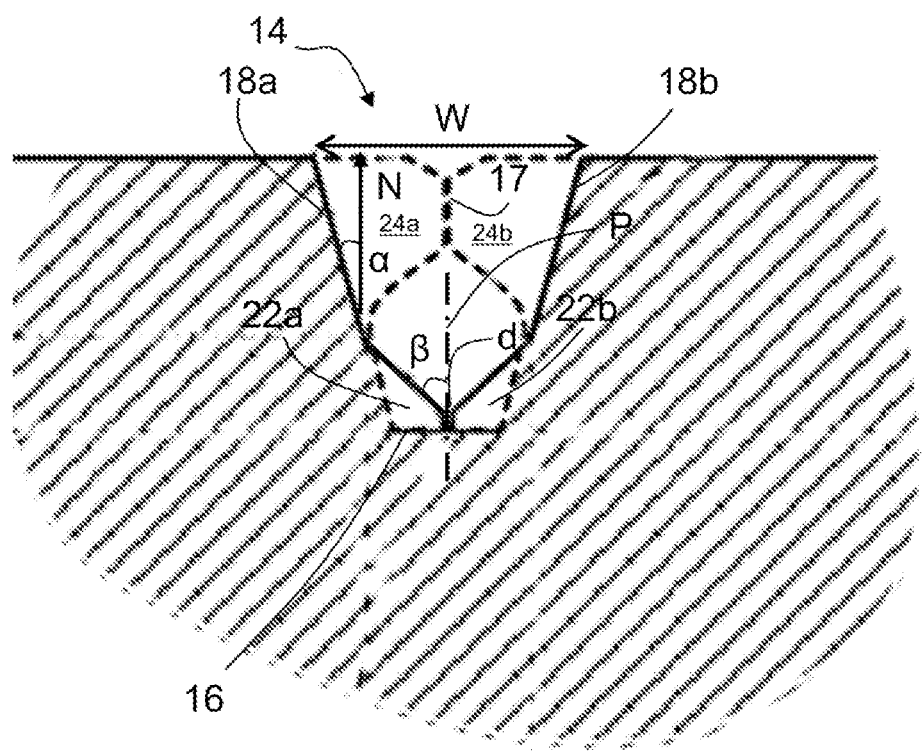
FIG. 3 is a view of the means for ejecting stones on a section line A-A.

The tread 12 comprises at least one cavity 14 that opens onto the tread surface in the new state, called external cavity 14. In the embodiment in FIG. 1, the tread 12 comprises at least three external cavities 14 that are aligned in a circumferential direction. Each external cavity 14 has a length L, a width W and a central plane P that separates said external cavity into two external half-cavities. The tread 12 also comprises cavities 15 that do not open onto the tread surface in the new state, called internal cavity 15. These internal cavities 15 are present in the depth of the tread and they open on the tread surface when the wear of said tread reaches a certain level of wear. At this level of wear, the external cavities 14 and the internal cavities 15 then form a continuous groove that extends in the circumferential direction. A "groove" means a cut in which the distance between the walls of material is such that the walls of this groove cannot come into contact with one another under usual running conditions. In the case of a groove, this distance between the walls of material is greater than 2 millimetres. The tread 12 also comprises at least one sipe 17 disposed between two external cavities 14. The sipe 17 opens both onto the tread surface of the tread and into an internal cavity 15. A "sipe" means a cut in which the distance between the walls of material is suitable for allowing the opposing walls delimiting said sipe to come into at least partial contact when in the contact patch in which the tire is in contact with the ground. In the case of a sipe, this distance between the walls of material is at most equal to 2 millimetres. FIG. 2 is an enlarged view of an external cavity 14 in FIG. 1. The external cavity 14 comprises a bottom 16 and at least two opposite lateral walls 18a, 18b extending from said bottom 16. The lateral walls 18a, 18b are inclined by an angle α with respect to a direction (N) normal to the tread surface of the tread, as is illustrated in FIG. 3. In order to make it easier to eject the stones from the external cavity 14, the angle α is greater than or equal to 15°. The external cavity 14 also comprises additional means 20 for ejecting stones during running. These means 20 for ejecting stones comprise two protuberances 22a, 22b that protrude from the bottom 16 of the cavity. Each protuberance 22a, 22b extends respectively from one of the lateral walls 18a, 18b, the protuberances facing one another. The protuberances 22a, 22b are thus disposed at least partially opposite one another at a distance d. This distance d is less than or equal to 10% of the width W of the external cavity 14. Preferentially, the distance d between the two protuberances is less than or equal to 5% of the width W of the external cavity. In a particular exemplary embodiment, the distance d is less than or equal to 1 mm. As is illustrated in FIG. 3, the protuberances 22a, 22b are inclined towards the central plane P. The protuberances 22a, 22b thus form an angle β with the normal direction (N). This angle β is greater than or equal to 17°. In one non-limiting embodiment, the angle β of the protuberances 22a, 22b is greater than or equal to the angle α of the lateral walls 18a, 18b. In another non-limiting embodiment, the sum of the angles α and β is greater than or equal to 35°. In another non-limiting embodiment, the sum of the angles α and β is less than or equal to 40°.

Figure 4:
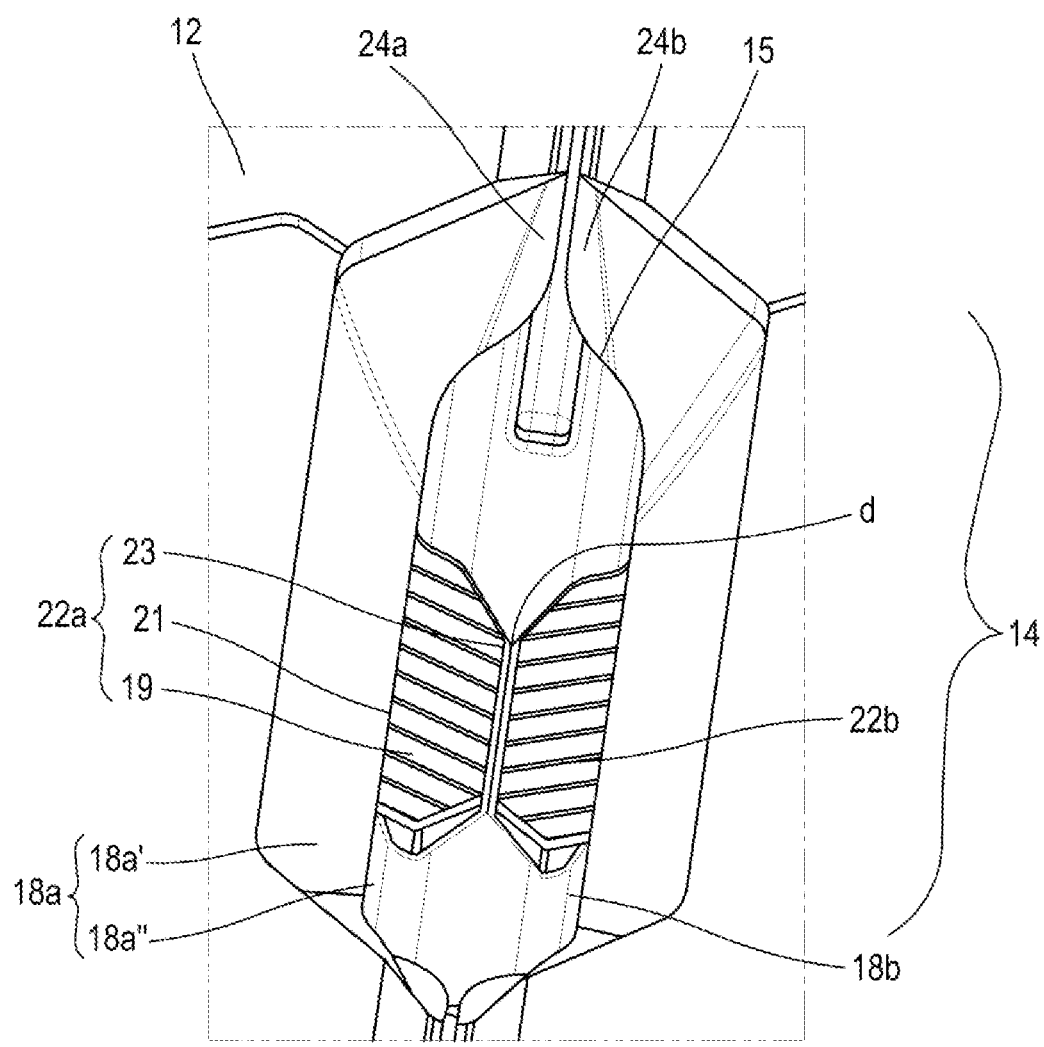
FIG. 4 is a perspective view of means for ejecting stones according to a second embodiment of the invention.
Figure 5:
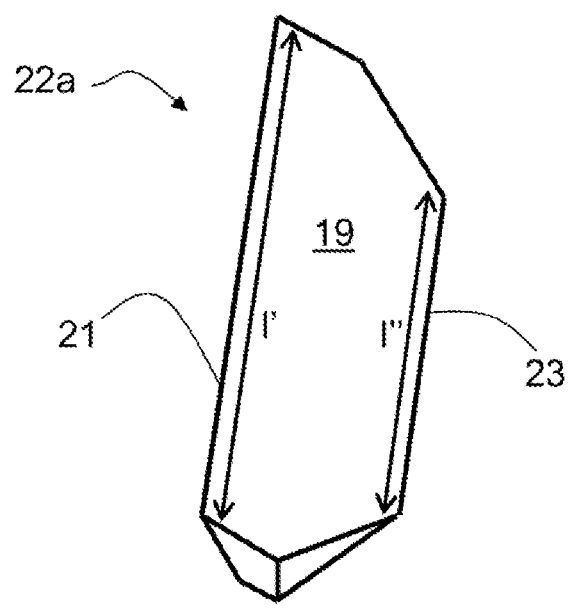
FIG. 5 is an enlarged view of a protuberance of the means for ejecting stones in FIG. 4.

FIGS. 4 and 5 illustrate a second embodiment of the means 20 for ejecting stones. In this second embodiment, each protuberance 22a, 22b has a contact surface 19 designed to come into contact with stones while the tire is running. The contact surface 19 will now be described in connection with the protuberance 22a. This contact surface 19 has a region 21 of attachment to the lateral wall 18a, of length l', and a delimiting region 23 in the external cavity 14, on the opposite side from the attachment region and of length l". The length l' of the attachment region is greater than the length l" of the delimiting region, such that the contact surface 19 has the overall shape of a regular trapezium. In a non-limiting embodiment, the contact surface 19 comprises a particular texture contrasting with the rest of the tread surface of the tread 12. This texture is formed by an organized arrangement of a plurality of elements, all or some of the elements in the arrangement being the repetition of one and the same basic element. This basic element can be a strand, a lamella or a protuberance in the shape of a parallelepiped. In a variant embodiment, this basic element is recessed.

In the exemplary embodiment in FIG. 4, the lateral wall 18a, 18b of the external cavity 14 has an inclined part 18a' and a straight part 18a" extending said inclined part 18a'. The inclined part 18a' extends as far as the tread surface of the tread and the straight part 18a" extends as far as the bottom 16 of the external cavity 14. In this case, the protuberance 22a extends from the straight part 18a" of the lateral wall 18a. It will be noted that the inclined part 18a' comprises two lips 24a, 24b that delimit the entrance to the internal cavity 15. These two lips 24a, 24b are illustrated in particular in FIGS. 3 and 4. It will also be noted that the bottom 16 of the external cavity belongs to the continuous groove that extends in the internal cavity 15.

Figure 6:
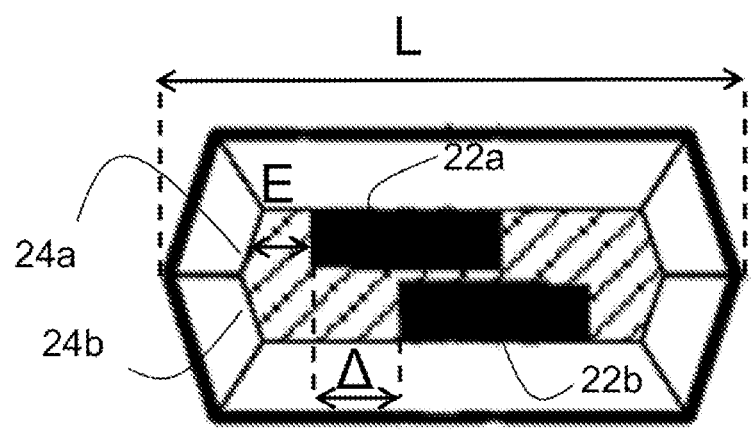
FIG. 6 is a variant of the arrangement of protuberances belonging to the means for ejecting stones in FIGS. 1 and 2.

FIG. 6 illustrates a variant of the arrangement of the protuberances 22a, 22b. In this particular embodiment, the protuberances 22a, 22b face each other but are offset by a distance Δ. The region of action of the protuberances 22a, 22b is then enlarged, this making it possible to better counter the trapping of stones in this external cavity 14. It will be noted that it is necessary to maintain a minimum space E between the protuberances 22a, 22b and the lips 24a, 24b that delimit the entrance to the internal cavity 15. This minimum space E corresponds to 5% of the length L of the external cavity 14.

The invention is not limited to the embodiments and variants presented and other embodiments and variants will become clearly apparent to a person skilled in the art.

In FIGS. 1 to 4 and 6, the spacing d is shown as being rectilinear. As a variant, this spacing may be non-rectilinear, for example a zigzag.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread for a tire, comprising:
   a tread surface intended to come into contact with a road surface during running, said tread comprising at least one cavity that opens onto the tread surface in a new state, called external cavity, said external cavity having a length L, a width W and a central plane P, said external cavity comprising a bottom and at least two opposite lateral walls extending from said bottom, said external cavity comprising means for ejecting stones during said running, wherein said means (20) for ejecting stones comprise:
   two protuberances protruding from the bottom of the external cavity, the two protuberances being disposed so that their respective axially inner faces are at least partially opposite one another at a distance d;
   a radially outer surface of each protuberance being inclined respectively from a lateral wall of the external cavity towards the central plane P; and
   the distance d between the two opposite axially inner faces of the protuberances being less than or equal to 10% of the width W of the external cavity,
   wherein each lateral wall of the external cavity has an inclined part extending as far as the tread surface and a straight part, each protuberance extending from the straight part of said respective lateral wall, the inclined parts extending towards each other forming a respective sipe.

2. The tread according to claim 1, wherein the distance d between the two protuberances is less than or equal to 5% of the width W of the external cavity.

3. The tread according to claim 1, wherein the distance d is less than or equal to 1 mm.

4. The tread according to claim 1, wherein at least one protuberance has a contact surface designed to come into contact with a stone, said contact surface having a region of attachment to the lateral wall of the external cavity, of length l', and a delimiting region in the external cavity, on the opposite side from the attachment region and of length l", the length l' of the attachment region being greater than the length l" of the delimiting region.

5. The tread according to claim 1, wherein the inclination (angle $\beta$) of the two protuberances greater than or equal to 17°.

6. The tread according to claim 1, wherein the lateral wall of the external cavity is at least partially inclined with respect to the tread surface of the tread, and the inclination (angle $\beta$) of each protuberance is greater than the inclination (angle $\alpha$) of said respective lateral wall.

7. The tread according to claim 1, wherein the protuberances are offset with respect to one another in a circumferential direction.

8. The tread according to claim 1, wherein said tread comprises a plurality of cavities that do not open onto the tread surface of the tread in the new state, called internal cavities, said internal cavities forming a continuous groove with the external cavities.

9. The tread according to claim 1, wherein said tread belongs to a heavy-duty tire.

10. The tread according to claim 1, wherein the respective axially inner faces of two protuberances are parallel to the central plane P.

* * * * *